Jan. 3, 1967     F. HERNIKL     3,295,582

TIRE CHAIN TIGHTENER

Filed April 9, 1965

INVENTOR.
FRANK HERNIKL.
BY
Willard S. Grove
ATTORNEY.

3,295,582
TIRE CHAIN TIGHTENER
Frank Hernikl, 301 E. El Comino Drive,
Phoenix, Ariz. 85020
Filed Apr. 9, 1965, Ser. No. 446,910
1 Claim. (Cl. 152—241)

This invention pertains to improvements in tire chain structures and is particularly directed to a tire chain tightening device.

One of the objects of this invention is to provide a tire chain tightener which is simple in construction and effective and efficient in use.

Still another object of this invention is to provide a tire chain tightening device adapted to keep the side chains tight at all times.

A still further object of this invention is to provide a tire chain tightening device which may be pulled up tight with the lines of force and action on the tightening device being such as to prevent the twisting, unlocking or loosening of the takeup device.

Still another object of this invention is to provide an improved tightening device for positively pulling up the side chains of a tire chain assembly.

Further features and advantages of this invention will appear from a detailed description of the drawings in which.

Figure 1:
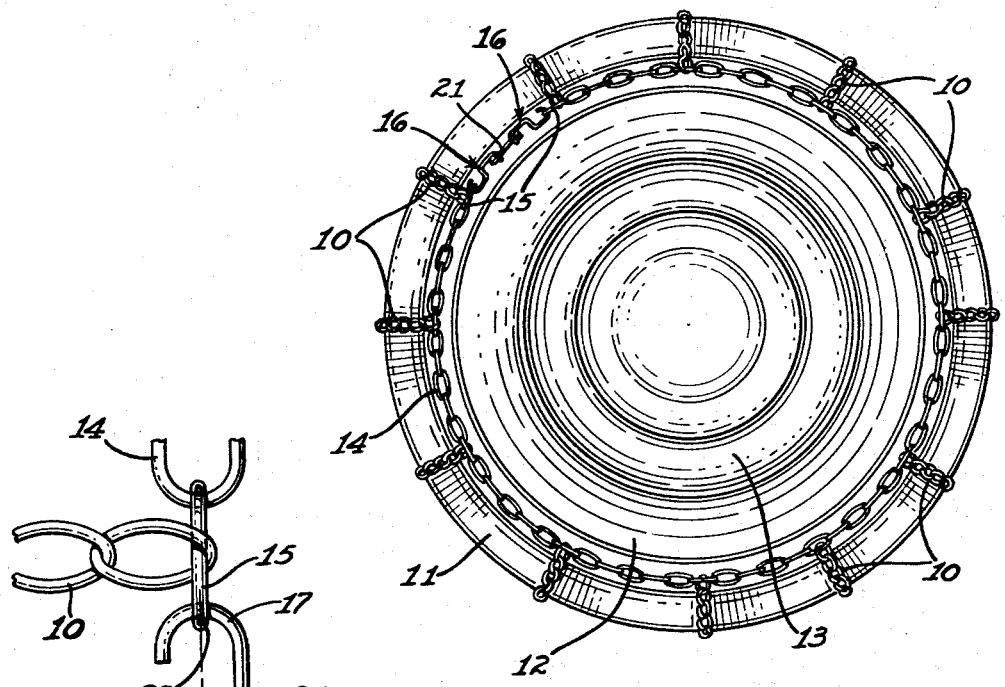
FIG. 1 is a side elevation of a tire showing a tire chain incorporating the features of this invention applied thereto.
Figure 2:
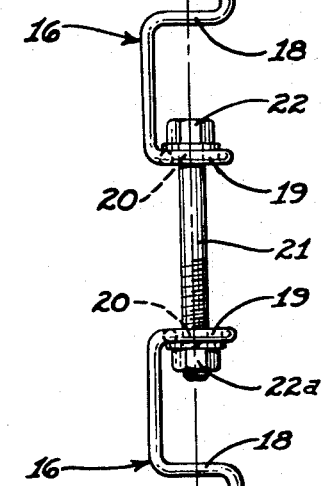
FIG. 2 is an enlarged fragmentary view of the tightening device and side chains incorporating the features of this invention.
Figure 2:
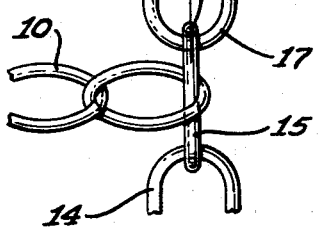

As an example of one embodiment of this invention there is shown a tire chain tightening device for a tire chain comprising the usual cross links 10 which engage the tread portion 11 of a tire 12 carried on the driving wheel 13 of an automotive vehicle. The ends of the cross links are hooked to the side chains 14 having the end links 15 which are drawn together by the special tire chain tightener of this invention.

The tightener device comprises a pair of opposed tension hooks 16 each having hook portions 17, intermediate transversely extending portions 18 and bent-over eyelet portions 19, the latter having openings 20 through which passes the tightening bolt 21 having the head 22 and the nut $22_a$.

It is to be noted that the points of engagement 23 of the hook portions 17 with the end links 15 of the side chains 14 lie on the axis 24 of the openings 20 and the bolt 21 so that a direct aligned pull on the axis 24 is always maintained when the nut $22_a$ is tightened, thus preventing twisting or entangling of the tightener with possible damage to the tire sidewalls.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendent claim are intended to be included herein.

Having thus fully set forth and described this invention what is claimed and desired to be obtained by United States Letters Patent is:

A chain tightener for a tire chain comprising in combination:

(A) a pair of oppositely disposed longitudinally spaced tension hooks having points of engagement with the ends of the tire chain defining an axis of pull each having (B) hook portions adapted to grip the opposite ends of the chain, (C) intermediate transversely diametrically radially disposed extending portions relative to said axis, (D) and bent-over radially disposed eyelet portions lying in a plane parallel to said intermediate portions on the opposite ends of each tension hook relative to said axis from said hook portions, (E) and a tightening bolt extending through said eyelet portions having a nut so as to interconnect said bolt between said eyelet portions with the axis of said bolt on said axis of pull, (F) said points of engagement of said hook portions with said side chain ends being located on the axis of said bolt, nut and eyelet portion openings of said tension hook for any degree of clamping of said bolt and nut.

References Cited by the Examiner
UNITED STATES PATENTS

| | | | |
|---|---|---|---|
| 1,617,346 | 2/1927 | Patton | 152—242 |
| 2,303,804 | 12/1942 | Waid | 152—241 X |
| 3,132,843 | 5/1964 | Brocato | 24—263.3 X |

ARTHUR L. LA POINT, *Primary Examiner.*

C. W. HAEFELE, *Assistant Examiner.*